United States Patent
Zhang et al.

(10) Patent No.: US 9,940,829 B2
(45) Date of Patent: Apr. 10, 2018

(54) METHODS AND DEVICES FOR BINDING A REMOTE CONTROL

(71) Applicant: Beijing Xiaomi Mobile Software Co., Ltd., Beijing (CN)

(72) Inventors: Yanlu Zhang, Beijing (CN); Deguo Meng, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/439,579

(22) Filed: Feb. 22, 2017

(65) Prior Publication Data
US 2017/0243475 A1   Aug. 24, 2017

(30) Foreign Application Priority Data
Feb. 24, 2016   (CN) .......................... 2016 1 0102819

(51) Int. Cl.
G05B 11/01   (2006.01)
G08C 17/02   (2006.01)
H04W 4/00   (2018.01)

(52) U.S. Cl.
CPC ............ *G08C 17/02* (2013.01); *H04W 4/008* (2013.01); *G08C 2201/20* (2013.01); *G08C 2201/32* (2013.01)

(58) Field of Classification Search
CPC .... G08C 17/02; G08C 2201/20; H04W 4/008
See application file for complete search history.

(56) References Cited

U.S. PATENT DOCUMENTS

2009/0262665 A1   10/2009   Kim et al.
2010/0149017 A1*  6/2010   Besshi ................... G08C 17/00
                                                                    341/176
(Continued)

FOREIGN PATENT DOCUMENTS

CN   101425223 A   5/2009
CN   103164938 A   6/2013
(Continued)

OTHER PUBLICATIONS

International Search Report and Written Opinion dated Nov. 11, 2016, International Application No. PCT/CN2016/093269, 12 pages.

(Continued)

*Primary Examiner* — Erin File
(74) *Attorney, Agent, or Firm* — Brinks, Gilson & Lione

(57) ABSTRACT

The present disclosure relates to methods, apparatus, and devices for binding a remote control to a remotely controllable device. In one implementation, a method is disclosed, including: acquiring, by the remote control, a binding operation instruction; sending, by the remote control, a binding request containing identification information of the remote control to a remotely controllable device with which the remote control is to be bound such that the remotely controllable device generates a binding response message in response to the binding request, wherein the binding response message comprises authentication information for binding the remote control; receiving, by the remote control, the binding response message from the remotely controllable device; and performing, by the remote control, binding with the remotely controllable device based on the binding response message, such that the remotely controllable device becomes bound to the remote control and the remote control becomes capable of controlling the bound remotely controllable device.

20 Claims, 20 Drawing Sheets

(56) References Cited

U.S. PATENT DOCUMENTS

| | | | |
|---|---|---|---|
| 2011/0095873 A1 | 4/2011 | Pratt et al. | |
| 2011/0273625 A1* | 11/2011 | McMahon | G06F 21/445 348/734 |
| 2012/0256735 A1* | 10/2012 | Gilson | G08C 23/04 340/12.17 |
| 2013/0117384 A1 | 5/2013 | Martch | |
| 2014/0273844 A1 | 9/2014 | Castillo et al. | |
| 2015/0273609 A1 | 10/2015 | Denis et al. | |
| 2016/0125733 A1* | 5/2016 | Sallas | G08C 17/02 398/106 |
| 2016/0196740 A1* | 7/2016 | Park | G08C 17/02 340/12.28 |
| 2016/0278151 A1* | 9/2016 | Kwon | G08C 23/04 |
| 2017/0097618 A1* | 4/2017 | Cipollo | G05B 15/02 |

FOREIGN PATENT DOCUMENTS

| | | |
|---|---|---|
| CN | 104361741 A | 2/2015 |
| CN | 105741525 A | 7/2016 |

OTHER PUBLICATIONS

Extended European Search Report dated Jun. 22, 2017 for European Application No. 17156771.2, 7 pages.

\* cited by examiner

METHODS AND DEVICES FOR BINDING A REMOTE CONTROL

CROSS-REFERENCE TO RELATED APPLICATIONS

This application is based on and claims priority to the Chinese patent application No. 201610102819.8, filed on Feb. 24, 2016, which is incorporated herein by reference in its entirety.

TECHNICAL FIELD

The present disclosure is related to smart terminals and devices, and more particularly, to methods and devices for binding a remote control.

BACKGROUND

With the popularization of smart home appliances, more and more smart home appliances (such as smart TVs, smart air conditioners etc.) are used in daily life. Accordingly, there is also an increasing number and types of remote controls (such as infrared remote controls, Bluetooth remote controls, etc.) around a user for controlling these home appliances. The user usually needs to go through the trouble of finding a desired remote control. Some remote controls are similar in appearance, which makes it harder for the user to identify the desired one and hence results in poor user experience.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one implementation, a method is disclosed for binding a remote control. The method includes: acquiring, by the remote control, a binding operation instruction; sending, by the remote control, a binding request containing identification information of the remote control to a remotely controllable device with which the remote control is to be bound such that the remotely controllable device generates a binding response message in response to the binding request, wherein the binding response message comprises authentication information for binding the remote control; receiving, by the remote control, the binding response message from the remotely controllable device; and performing, by the remote control, binding with the remotely controllable device based on the binding response message, such that the remotely controllable device becomes bound to the remote control and the remote control becomes capable of controlling the bound remotely controllable device.

In another implementation, a method is disclosed for binding a remote control. The method includes: receiving, by a remotely controllable device, a binding request containing identification information of the remote control and sent by the remote control; generating, by the remotely controllable device, a binding response message based on the binding request, wherein the binding response message contains authentication information for binding the remote control; and sending, by the remotely controllable device, the binding response message to the remote control, such that the remote control performs binding with the remotely controllable device based on the binding response message such that the remotely controllable device becomes bound to the remote control and the remote control become capable of controlling the remotely controllable device.

In another implementation, an apparatus is disclosed for binding a remote control. The apparatus may be part of the remote control and includes: an acquiring module configured to acquire a binding operation instruction; a sending module configured to send a binding request containing identification information of the remote control for binding the remote control to a remotely controllable device with which the remote control is to be bound, such that the remotely controllable device generates a binding response message in response to the binding request, wherein the binding response message contains authentication information for binding the processing apparatus for binding the remote control; a receiving module configured to receive the binding response message from the remotely controllable device; and a first processing module configured to perform binding with the remotely controllable device based on the binding response message, such that the remotely controllable device becomes bound to the remote control and the remote control becomes capable of controlling the remotely controllable device.

In another implementation, an apparatus for binding a remote control with a remotely controllable device is disclosed. The apparatus may be part of the remotely controllable device and includes: a receiving module configured to receive a binding request containing identification information of the remote control and sent by the remote control; a processing module configured to generate a binding response message based on the binding request, wherein the binding response message contains authentication information for binding the remote control; and a sending module configured to send the binding response message to the remote control, such that the remote control performs binding with the remotely controllable device based on the binding response message, and the remotely controllable device becomes bound to the remote control and the remote control becomes capable of controlling the remotely controllable device.

In another implementation, a remote control is disclosed. The remote control includes: a memory configured to store executable instructions; a processor configured to control execution of the executable instructions; a receiver; and a transmitter, wherein: the processor is configured to acquire a binding operation instruction; the transmitter is configured to send a binding request containing identification information of the remote control to a remotely controllable device with which the remote control is to be bound such that the remotely controllable device generates a binding response message in response to the binding request, wherein the binding response message comprises authentication information for binding the remote control; the receiver is configured to receive the binding response message from the remotely controllable device; and the processor is further configured to perform binding with the remotely controllable device based on the binding response message, such that the remotely controllable device becomes bound to the remote control and the remote control becomes capable of controlling the bound remotely controllable device.

In another implementation, a remotely controllable device is disclosed. The remotely controllable device includes: a memory configured to store executable instructions; a processor configured to control execution of executable instructions; a receiver; and a transmitter. The receiver is configured to receive a binding request containing identification information of a remote control and sent by the remote control. The processor is configured to generate a binding response message based on the binding request, wherein the binding response message contains authentication information for binding the remote control. The transmitter is configured to send the binding response message to the remote control, such that the remote control performs binding with the remotely controllable device based on the binding response message, and such that the remotely controllable device becomes bound to the remote control and the remote control becomes capable of controlling the bound remotely controllable device.

In yet another implementation, a non-transitory computer-readable storage medium having stored therein instructions is disclosed. The instructions, when executed by a processor of a mobile controller, cause a remote control to: acquire a binding operation instruction; send a binding request containing identification information of the remote control to a remotely controllable device with which the remote control is to be bound, such that the remotely controllable device generates a binding response message in response to the binding request, wherein the binding response message comprises authentication information for binding the remote control; receive the binding response message from the remotely controllable device; and perform binding with the remotely controllable device based on the binding response message, such that the remotely controllable device becomes bound to the remote control and the remote control becomes capable of controlling the bound remotely controllable device.

It should be understood that both the foregoing general description and the following detailed description are only exemplary and explanatory and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

The terms used herein are merely for describing a particular embodiment, rather than limiting the present disclosure. As used in the present disclosure and the appended claims, terms in singular forms such as "a", "said" and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when", "where" or "in response to that".

Figure 1:
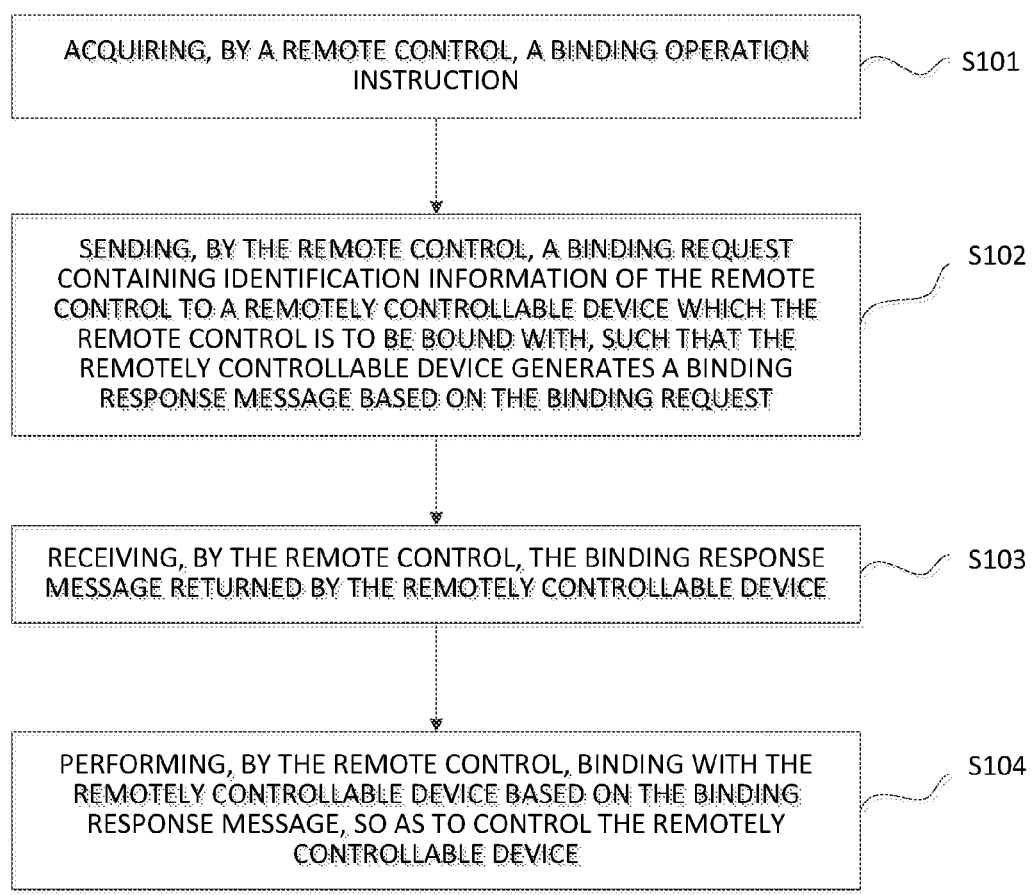
FIG. 1 is a flow chart showing a first embodiment of a processing method for binding a remote control according to the disclosure.

FIG. 1 is a flow chart of a first method embodiment of the present disclosure, showing a method for binding a remote control. As shown in FIG. 1, the method is mainly performed by the remote control. The remote control can be bound with and control different terminals based on a user's operations, the terminals including home appliances, such as TVs, air conditioners, etc. These terminals may be referred as remotely controllable devices. The processing method for binding the remote control comprises the steps as follows.

In step S101, the remote control acquires a binding operation instruction from the user.

In this step, when the user intends to control a remotely controllable device using the remote control, he needs to bind the remote control with the corresponding remotely controllable device, so that the remote control can become capable of controlling the remotely controllable device. Specific implementations for the remote control to acquire the binding operation instruction may include at least one of the following.

In a first implementation, the remote control detects a pressing operation on a binding key by the user as the binding operation instruction. That is, the user may issue an operation instruction by pressing a key arranged on the remote control and dedicated for binding, or the binding may be realized by pressing a specific function key on the remote control for, e.g., longer than a preset time period.

In a second implementation, the remote control detects a user's shaking operation on the remote control as the binding operation instruction. That is, a user's movement trajectory for binding may be preset. When it is detected that a movement trajectory of the remote control is substantially the same as the movement trajectory preset for binding, it is considered that the user intends to perform the binding.

In step S102, the remote control sends a binding request containing identification information of the remote control to a remotely controllable device with which the remote control is to be bound, such that the remotely controllable device generates a binding response message based on the binding request.

In this step, the remote control sends the binding request containing identification information of the remote control to the remotely controllable device based on the acquired binding operation instruction, such that the remotely controllable device judges whether to respond, wherein the binding response message carries authentication information for binding the remote control. For example, if the remotely controllable device has no remote control bound therewith or otherwise allows the binding, the remotely controllable device may decide to generate the binding response message containing the related authentication information and returns the binding response message to the remote control.

The binding request may be sent through broadcasting, targeted unicasting or multicasting, which will not be limited in this disclosure. For example, the binding request may be sent via Bluetooth. The remote control may send the binding request containing the identification information of the remote control through Bluetooth broadcasting, and the binding response message may comprise Bluetooth pairing information generated by the remotely controllable device.

The identification information may be a device identification of the remote control, a media access control address thereof or any other identification thereof, which will not be limited in this disclosure.

In step S103, the remote control receives the binding response message returned by the remotely controllable device.

In step S104, the remote control performs binding with the remotely controllable device based on the binding response message, so as to become capable of controlling the remotely controllable device. The remotely controllable device consequently becomes a bound remotely controllable device.

In this step, the remote control performs verification and authentication based on the authentication information in the binding response message, confirms that the remotely controllable device allows the remote control to be bound therewith, and performs binding with the remotely controllable device so as to become capable of controlling the remotely controllable device.

When the binding is performed via Bluetooth, the remote control receives the Bluetooth pairing information. After pairing according to the pairing information, the remote control sends a pairing success message to the remotely controllable device. Thus, a Bluetooth connection is established, and binding for controlling the remotely controllable device is realized.

Once the remotely controllable device becomes bound, the remote control can control the bound remotely controllable device to perform a functions corresponding to operations of the user on the remote control. That is, the remote control can remotely control the bound remotely controllable device based on an operation of the user.

According to the method for binding a remote control provided by the embodiment of the present disclosure above, a remote control acquires a binding operation instruction from a user, and sends a binding request to a remotely controllable device, such that the remotely controllable device generates authentication information for binding the remote control. As such, a single remote control can be bound with multiple remotely controllable devices, thereby enhancing user experience by avoiding problems and inconvenience associated with having to operate multiple remote controls.

Further, as a specific implementation, the binding is performed via Bluetooth. In one implementation, a remote control broadcasts a binding request message. A remotely controllable device may be provided with a module that responds to the binding request or is capable of responding to the binding request. A device not provided with such a module or not capable of responding to the binding request may not be bound with the remote control. For example, a handset does not need to be controlled by the remote control, so the handset may not be designed to respond to the Bluetooth broadcasting message from the remote control. A remotely controllable device capable of responding to the broadcasting message may generate corresponding pairing information, and cause the remote control to automatically bound with the remotely controllable device. As such, a user can control operations of the bound remotely controllable device using the remote control. The user may further bind the remote control with other remotely controllable devices, thereby enhancing user experience by avoiding the problem associated with having to use multiple remote controls to control multiple remotely controllable devices.

Figure 2:
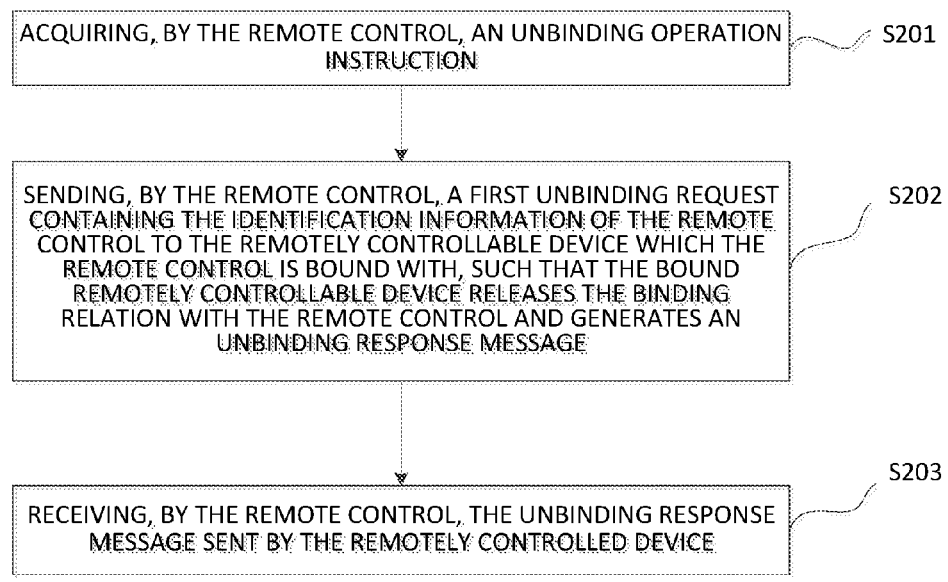
FIG. 2 is a flow chart showing a second embodiment of the processing method for binding the remote control according to the disclosure.

FIG. 2 is a flow chart showing a second method embodiment of the present disclosure, showing a method for unbinding the remote control. As shown in FIG. 2, after the remote control and the remotely controllable device are bound so that the former can control the latter, the binding relation may be removed as needed. That is, after S104 of FIG. 1, the method for unbinding the remote control may comprise steps S201-S203.

In step S201, the remote control acquires an unbinding operation instruction.

In this step, if the user needs to release the binding (that is, to remove the control relationship between the remote control and the particular bound remotely controllable device), an operation on a specific key on the remote control by the user or a special movement trajectory of the remote control may be acquired as an unbinding operation instruction, similarly to the above implementations for acquiring the binding operation instruction.

In step S202, the remote control sends a first unbinding request containing the identification information of the remote control to the remotely controllable device with which the remote control is bound, such that the bound remotely controllable device releases the binding relation with the remote control and generates an unbinding response message.

In step S203, the remote control receives the unbinding response message sent by the bound remotely controllable device.

In this embodiment, if the user needs to release the binding between the remote control and the bound remotely controllable device, an unbinding request may be sent to the latter, requesting the bound remotely controllable device to release the binding relation. Then, the bound remotely controllable device responds to the unbinding request based on an identification of the remote control, and returns an unbinding response message, thereby releasing the binding with the remote control. If it is desired to control the unbound remotely controllable device using the remote control later, binding may be reestablished according to the method embodiment shown in FIG. 1.

Figure 3:
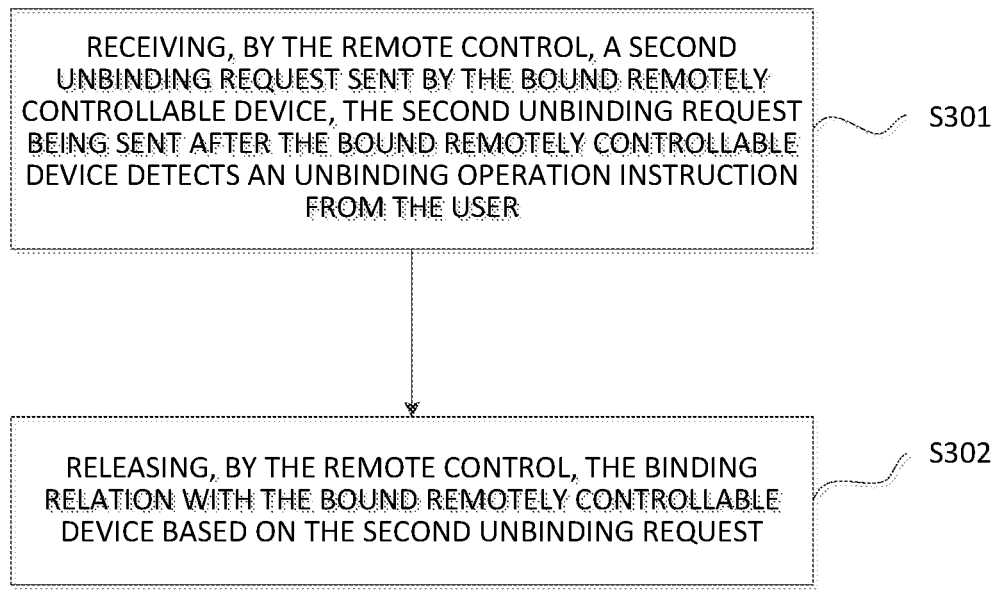
FIG. 3 is a flow chart showing a third embodiment of the processing method for binding the remote control according to the disclosure.

FIG. 3 is a flow chart showing a third method embodiment of the present disclosure, illustrating another method for unbinding the remote control. FIG. 3 illustrates a solution alternative to that shown in FIG. 2. After the remote control and the remotely controllable device are bound so that the former can control the latter, the binding relation may be removed as needed. That is, after S104, the method for unbinding the remote control may comprise steps S301-S302.

In step S301, the remote control receives a second unbinding request sent by the bound remotely controllable device, the second unbinding request being sent after the bound remotely controllable device detects an unbinding operation instruction from the user.

In step S302, the remote control releases the binding relation with the bound remotely controllable device based on the second unbinding request.

The solution shown in FIG. 3 is alternative to that shown in FIG. 2. That is, when it is desired to perform unbinding, the unbinding may be triggered by either the remote control (as in FIG. 2) or the bound remotely controllable device (as in FIG. 3). Upon detecting an operation by the user on the bound remotely controllable device (FIG. 3), such as a pressing on a special key on the bound remotely controllable device for releasing the binding with the remote control, an unbinding request is generated and sent to the remote control from the bound remotely controllable device.

According to the method for binding and unbinding the remote control provided by the two embodiments of the present disclosure above (FIGS. 2 and 3), after the remote control is bound with multiple remotely controllable device according to any of the above solutions, these remotely controllable devices can be operated by the same remote control. If the binding with any of the bound remotely controllable device needs to be released, it can be realized by detecting user release operation by either the remote control or the bound remotely controllable device to be unbound. Similar to the binding process, an unbinding message is sent either from the remote control to the bound remotely controllable device to be unbound or from the bound remotely controllable device to be unbound to the remote control in response to the detected user's release operation, in order to release the binding. Thus, binding and unbinding can be realized at the user's direction, thereby improving user experience.

Figure 4:
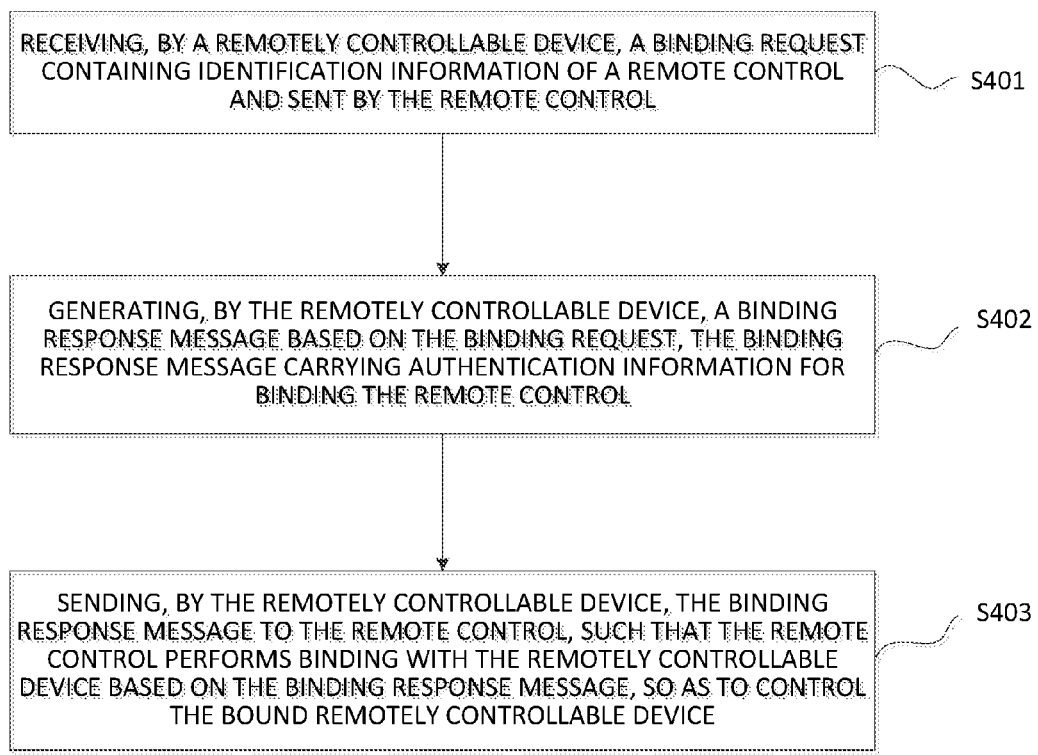
FIG. 4 is a flow chart showing a fourth embodiment of the processing method for binding the remote control according to the disclosure.

FIG. 4 is a flow chart showing a fourth method embodiment of the present disclosure, illustrating a method for binding the remote control by the remote controllable device. As shown in FIG. 4, the method is performed by a remotely controllable device, which may be a home appliance such as a TV, an air conditioner, etc. The processing method for binding the remote control comprises steps S401-S403.

In step S401, the remotely controllable device receives a binding request containing identification information of the remote control and sent by the remote control.

In this embodiment, the remotely controllable device receives a binding request sent by the remote control. The binding request may be a broadcasting message, a unicasting message targeted to a particular remotely controllable device or a multicasting message targeted to a certain type of remotely controllable devices. A remotely controllable device may be provided with a module for or capability of responding to the binding request. A device that does not process such an module or capability may not respond to the request and thus may not be bound to the remote control.

In step S402, the remotely controllable device generates a binding response message based on the binding request, the binding response message carrying authentication information for binding the remote control.

In this step, the binding response message may indicate whether to approve the binding. If the remotely controllable device approves establishment of a binding relation with the remote control, binding configurations can be performed directly in the remotely controllable device, and a binding response message may be returned. In addition, corresponding authentication information may be generated and included in the binding response message according to the above solution, so that the remote control can perform recognition and authentication to complete pairing. One specific implementation is to use Bluetooth. Specially, the remotely controllable device receives the binding request containing identification information of the remote control and sent by the remote control through Bluetooth broadcasting, and generates a binding response message comprising Bluetooth pairing information.

In step S403, the remotely controllable device sends the binding response message to the remote control, such that the remote control completes binding with the remotely controllable device based on the binding response message so as to become capable of controlling the operation of bound remotely controllable device.

In this step, taking Bluetooth as an example, the remotely controllable device returns pairing information to the remote control. The remote control performs pairing based on the pairing information. Thus, a Bluetooth connection is established between the remotely controllable device and the remote control, and binding for controlling the remotely controllable device is realized.

After binding between the remote control and the remotely controllable device is realized according to the above solution, the user can control the bound remotely controllable device by operating the remote control. The bound remotely controllable device receives an operation request sent by the remote control, and performs a corresponding operation based on the operation request.

According to the method for binding a remote control provided by the embodiment of the present disclosure above, when no remote control is bound with a remotely controllable device, the remotely controllable device may generates a binding response message carrying authentication information after receiving a binding request sent by the remote control, and send the binding response message to the remote control for mutual authentication and verification. Then, the binding is performed, and the bound remotely controllable device performs functions based on the operations of the bound remote control. This solution eliminates the need to operate the remotely controllable device using a dedicated remote control. Rather, the remotely controllable device can be controlled by the remote control so long as the binding is established, thereby improving user experience by avoiding the problem associated with multiple remote controls for multiple remotely controllable devices.

Figure 5:
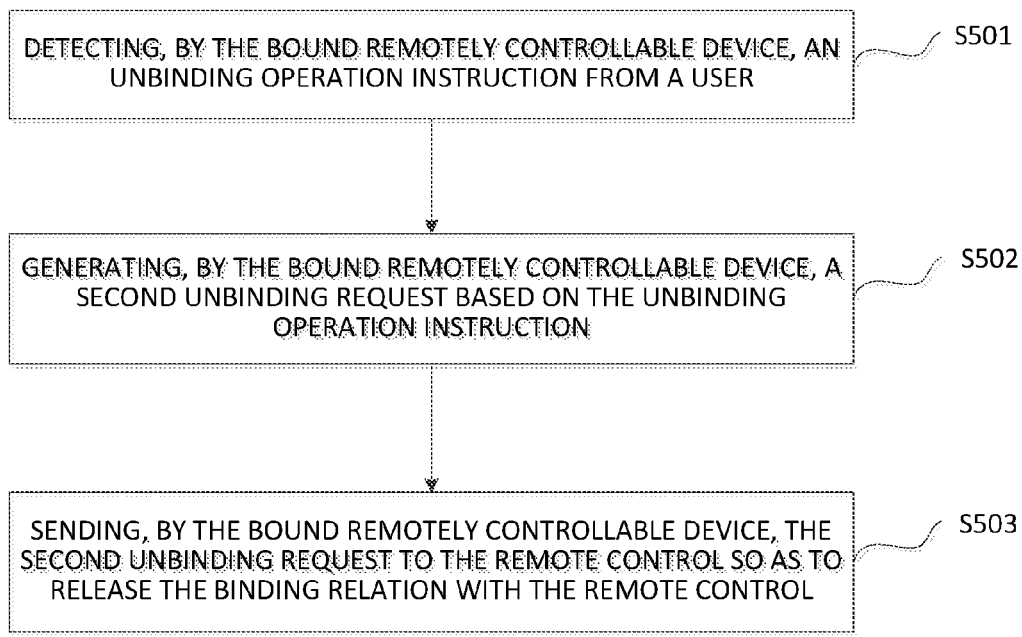
FIG. 5 is a flow chart showing a fifth embodiment of the processing method for binding the remote control according to the disclosure.

FIG. 5 is a flow chart showing a fifth embodiment of the present disclosure, illustrating a method for unbinding the remote control according. As shown in FIG. 5, the method is performed by a bound remotely controllable device. Based on the above method embodiment for establish binding between the remotely controllable device and the remote control, the bound remotely controllable device performs functions under the control of the remote control. The user may desire to remove the binding according as needs. The method for unbinding the remote control comprises steps S501-S503.

In step S501, the bound remotely controllable device detects an unbinding operation instruction from a user.

In this step, the user may directly operate a preset key on the bound remotely controllable device for removing the binding. The bound remotely controllable device can detect the unbinding operation instruction.

In step S502, the bound remotely controllable device generates a second unbinding request based on the unbinding operation instruction from the user.

In step S503, the bound remotely controllable device sends the second unbinding request to the remote control so as to release the binding relation with the remote control.

In this embodiment, the unbinding is triggered by the bound remotely controllable device. Alternatively, the unbinding may be triggered by the remote control. According to the technical solution of this disclosure, the same remote control may be bound with multiple remotely controllable devices; and multiple remote controls may be bound with the same remotely controllable device so that the multiple remote controls can control the same remotely controllable device.

In one implementation of the method of FIG. 5, the triggering of the unbinding by the remote control may be implemented by performing the steps of: receiving, by the remotely bound controllable device, a first unbinding request containing the identification information of the remote control and sent by the remote control; releasing, by the bound remotely controllable device, the binding relation with the remote control and generating, by the bound remotely controllable device, an unbinding response message based on the first unbinding request; and sending, by the unbound remotely controllable device, the unbinding response message to the remote control.

The first unbinding request may contain the identification information of the remote control, such that in the implementation where the bound remotely controllable device is bound to multiple remote controls, the bound remotely controllable device can identify which remote control is to be unbound with the previously bound remotely controllable device.

Remotely controllable devices and a remote controls may be specifically configured or improved for implementing the technical solution provided by any of the embodiments above. For example, typical remotely controllable devices such as TVs, set-top boxes, etc. will have no remote control bound therewith, when leaving factory. However, after receiving from any remote control described above a Bluetooth control instruction (carrying the MAC address of the remote control, for example) for the first time, the remotely controllable device will have the remote control automatically bound therewith. To achieving the binding, the user may press a special key on the remotely controllable device, such as a TV or a set-top box, to place the remotely controllable device into a binding mode. Alternatively, the remotely controllable device may automatically enters a binding mode if it has not bound with any remote control. The user may then press a "binding" key on the remote control. The remote control sends a wireless message containing its MAC address. After receiving the message, the remotely controllable device such as a TV and a set-top box may be bound with the remote control automatically.

When the user needs to unbind the remote control from a remotely controllable device already bound, the user may press a special key on the bound remotely controllable device or a special key on the remote control for unbinding the remote control as described above. In this way, the same remote control can control multiple remotely controllable devices (simultaneously). For example, by pressing either the "binding" key on the remote control or the "binding" key on the bound remotely controllable device for longer than a predefined period of time, e.g., 5 seconds, the remote control can be unbound from the previously bound remotely controllable device.

According to the methods for unbinding the remote control provided by the embodiment of the present disclosure, the remotely controllable device can either initiate an unbinding request to the remote control based on user's unbinding operation received at the remotely controllable device, or receive an unbinding request initiated from the remote control, in order to release the binding relation between the remote control and the previously bound remotely controllable device. Thus, binding and unbinding can be realized conveniently, thereby improving user experience.

Figure 6:
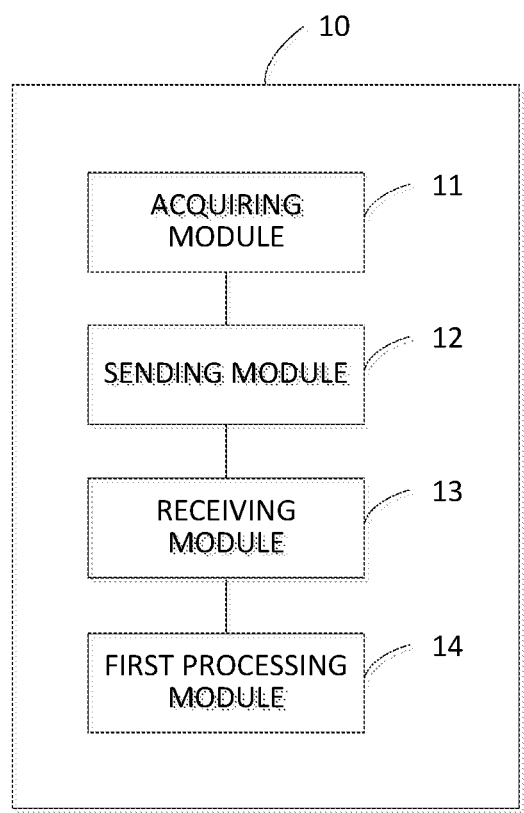
FIG. 6 is a block diagram illustrating a first embodiment of an apparatus for binding a remote control according to the disclosure.

FIG. 6 is a block diagram of a first apparatus embodiment according to the present disclosure, illustrating an apparatus for binding a remote control. Referring to FIG. 6, the apparatus 10 may be part of the remote control and responsible for binding the remote control. The apparatus 10 may comprise: an acquiring module 11 configured to acquire a binding operation instruction; a sending module 12 configured to send a binding request containing identification information of the apparatus or the remote control for binding the remote control to a remotely controllable device which the remote control is to be bound with, such that the remotely controllable device generates a binding response message based on the binding request. The binding response message may carry authentication information for binding the apparatus or the remote control. The apparatus 10 may further comprise a receiving module 13 configured to receive the binding response message returned by the remotely controllable device and a first processing module 14 configured to perform binding with the remotely controllable device based on the binding response message, such that the remotely controllable device may be controlled by the remote control.

According to the apparatus for binding the remote control provided by the embodiment above, a binding operation instruction may be acquired from a user by the acquiring module, and a binding request is sent by the sending module to a remotely controllable device which the remote control is to be bound with, such that the remotely controllable device generates related authentication information to be used by the first processing module to bind the remote control. As such, the same remote control can be bound with multiple devices, thereby improving user experience by avoiding the problem associates with having to use multiple remote controls to control multiple remotely controllable devices.

Figure 7:
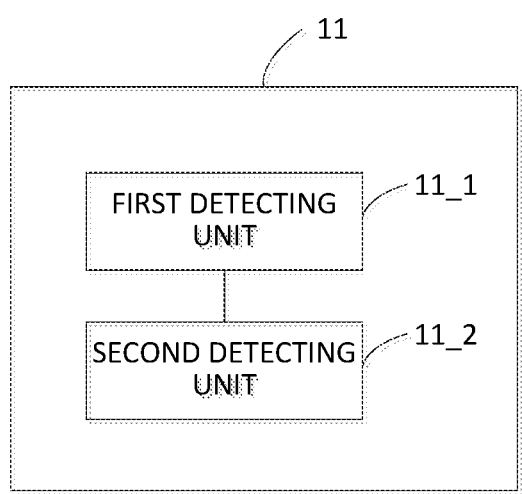
FIG. 7 is a block diagram illustrating a second embodiment of an apparatus for binding the remote control according to the disclosure.

Based on the embodiment shown in FIG. 6, FIG. 7 is a block diagram of a second apparatus embodiment of the present disclosure, illustrating an apparatus for binding a remote control. Referring to FIG. 7, the acquiring module 11 of FIG. 6 comprises: a first detecting unit 11_1 configured to detect a user's operation on, e.g., a binding key as the binding operation instruction; or a second detecting unit 11_2 configured to detect a user's shaking operation on the remote control as the binding operation instruction.

Figure 8:
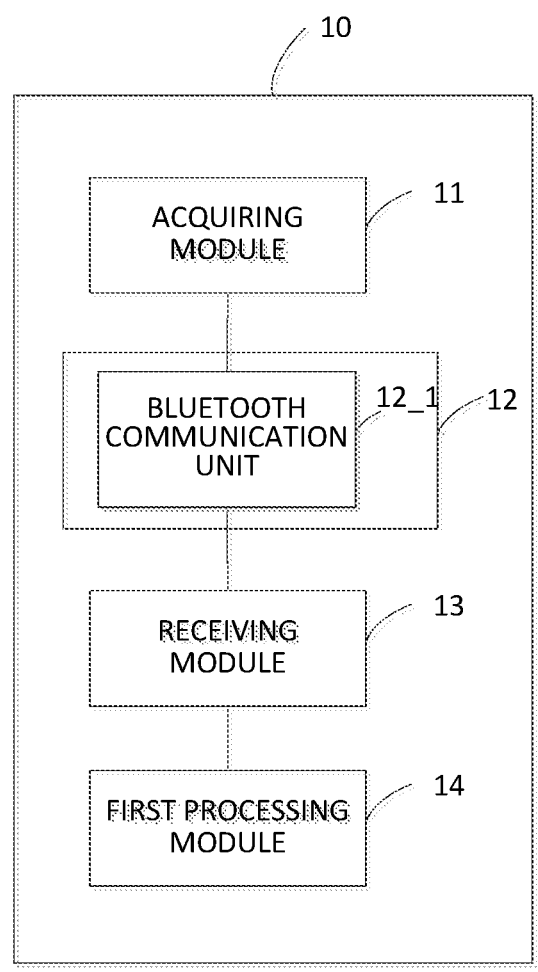
FIG. 8 is a block diagram illustrating a third embodiment of an apparatus for binding the remote control according to the disclosure.

Based on the embodiment shown in FIG. 6, FIG. 8 is a block diagram of a third apparatus embodiment of the present disclosure, illustrating an apparatus for binding the remote control. Referring to FIG. 8, the sending module 12 of FIG. 6 comprises: a Bluetooth communication unit 12_1 configured to send the binding request containing the identification information of the apparatus for binding the remote control through Bluetooth broadcasting. The binding response message received by the receiving module 13 comprises Bluetooth pairing information generated by the remotely controllable device.

Figure 9:
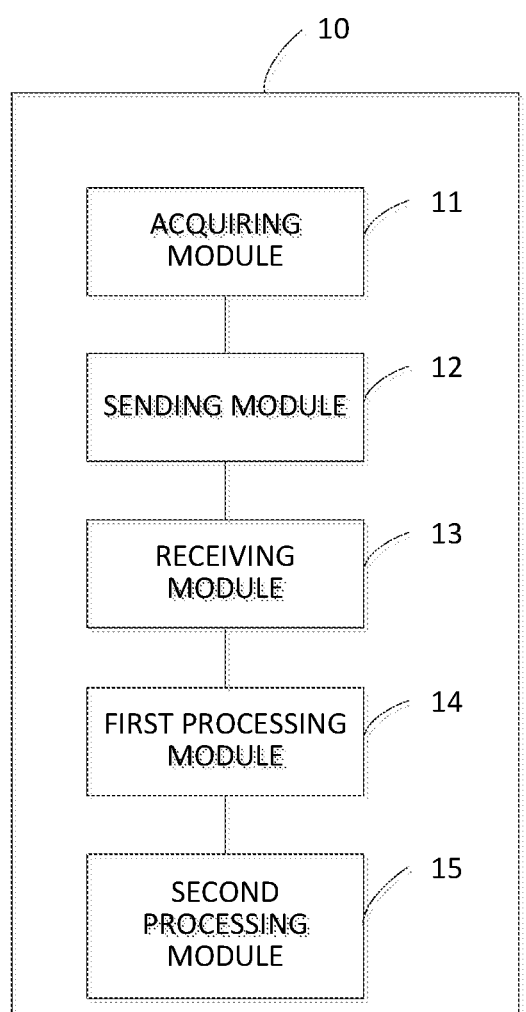
FIG. 9 is a block diagram illustrating a fourth embodiment of an apparatus for binding the remote control according to the disclosure.

Based on the embodiment shown in any of FIGS. 6-8, FIG. 9 is a block diagram of a fourth apparatus embodiment of the present disclosure, illustrating an apparatus for binding the remote control. Referring to FIG. 9, the apparatus 10 of FIG. 6 further comprises: a second processing module 15 configured to remotely control the bound remotely controllable device based on an operation of a user.

According to the apparatus for binding the remote control provided above, a remote control can detect a user's operation on, e.g., a function key of the remote control or a special operation such as shaking of the remote control by the user.

Figure 10:
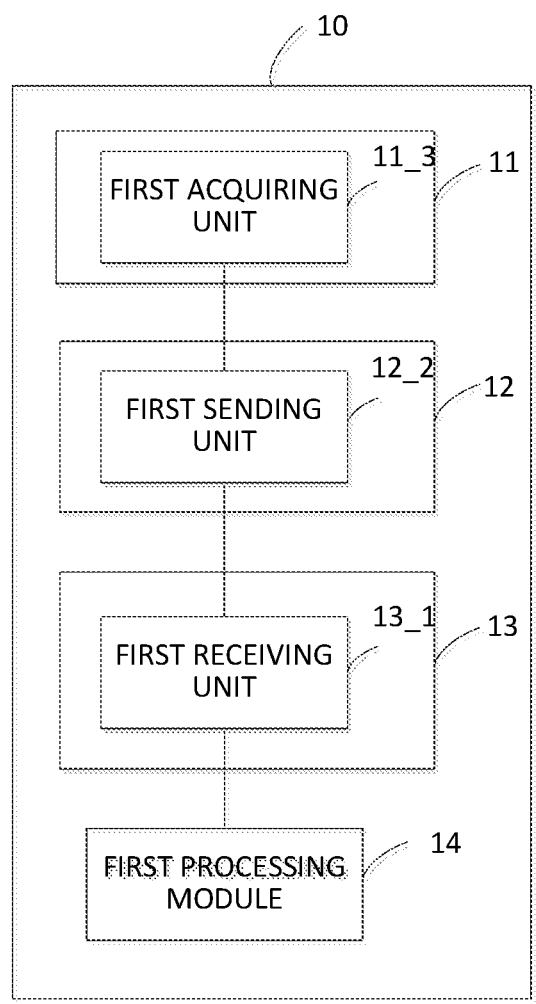
FIG. 10 is a block diagram illustrating a fifth embodiment of an apparatus for binding the remote control according to the disclosure.

Based on the embodiment shown in any of FIGS. 6-9, FIG. 10 is a block diagram of a fifth apparatus embodiment of the present disclosure, illustrating an apparatus for binding the remote control. Referring to FIG. 10, the acquiring module 11 of FIG. 6 comprises: a first acquiring unit 11_3 configured to acquire an unbinding operation instruction. The sending module 12 comprises a first sending unit 12_2 configured to send a first unbinding request containing the identification information of the apparatus for unbinding the remote control to the remotely controllable device which the remote control is bound with, such that the bound remotely controllable device releases the binding relation with the apparatus of the remote control and generates an unbinding response message. The receiving module 13 comprises a first receiving unit 13_1 configured to receive the unbinding response message sent by the remotely controllable device.

Figure 11:
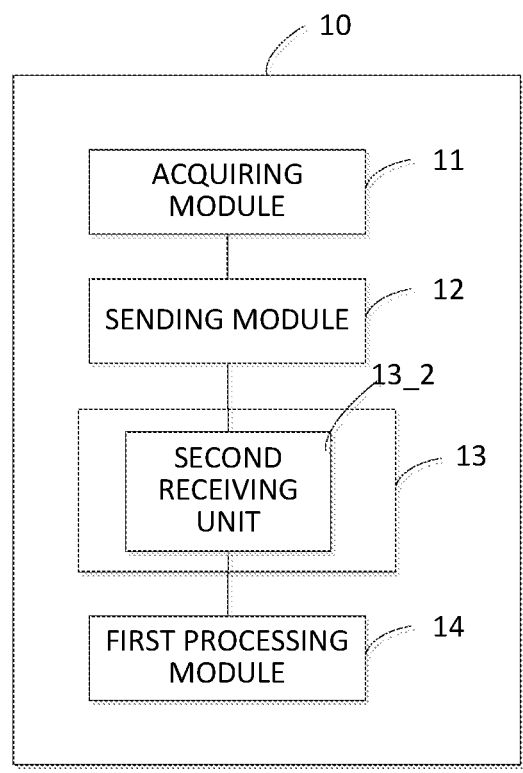
FIG. 11 is a block diagram illustrating a sixth embodiment of an apparatus for binding the remote control according to the disclosure.

Based on the embodiment shown in any of FIGS. 6-10, FIG. 11 is a block diagram of a sixth apparatus embodiment of the present disclosure, illustrating an apparatus for binding the remote control. Referring to FIG. 11, the receiving module 13 of FIG. 6 further comprises: a second receiving unit 13_2 configured to receive a second unbinding request sent by the bound remotely controllable device, the second unbinding request being sent after the bound remotely controllable device detects an unbinding operation instruction from the user. The first processing module 14 is further configured to release the binding relation with the bound remotely controllable device based on the second unbinding request.

According to the apparatus for binding the remote control provided by the embodiments above, after the remote control is bound with the remotely controllable device according to any of the above solutions, multiple remotely controllable devices can be operated by the same remote control. If the binding needs to be released, it can be realized by operating either the remote control or a bound remotely controllable device. Similar to the binding process, an unbinding message is sent according to the user's operation, in order to release the binding. Thus, binding and unbinding can be realized by the user conveniently, thereby improving the user experience.

Figure 12:
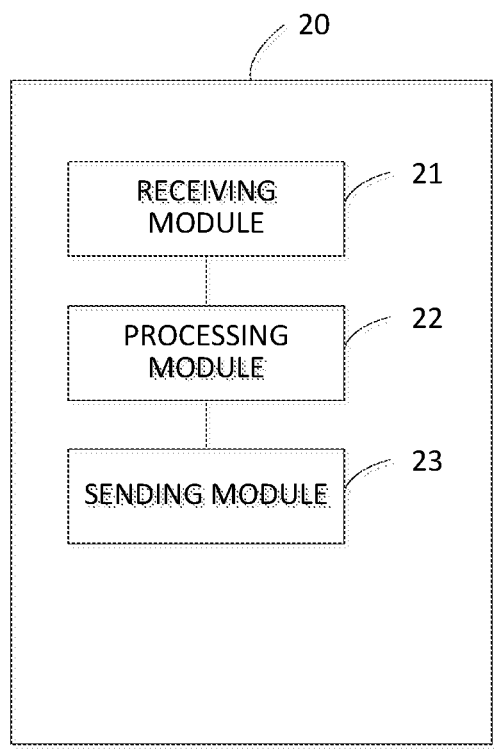
FIG. 12 is a block diagram illustrating a seventh embodiment of an apparatus for binding the remote control according to the disclosure.

FIG. 12 is a block diagram of a seventh apparatus embodiment of the present disclosure, illustrating an apparatus for binding the remote control to a remotely controllable device. Referring to FIG. 12, the apparatus for binding a remote control 20 may be part of the remotely controllable device and may comprise: a receiving module 21 configured to receive a binding request containing identification information of the remote control and sent by the remote control; a processing module 22 configured to generate a binding response message based on the binding request, the binding response message carrying authentication information for binding the remote control; and a sending module 23 configured to send the binding response message to the remote control, such that the remote control performs binding with the apparatus for binding the remote control based on the binding response message so as to become cable of controlling the remotely controllable device.

According to the apparatus 20 for binding the remote control provided above, after the receiving module 21 receives the binding request sent by the remote control when no remote control is bound with the remotely controllable device, the processing module 22 generates a binding response message carrying authentication information, and the sending module 23 sends the same to the remote control for mutual authentication. Then, the binding is performed, and the remotely controllable device performs functions based on the operations of the bound remote control. This solution eliminates the need to operate the remotely controllable device by using a dedicated remote control. Rather, the remotely controllable device can be operated by binding to a generic remote control, thereby improving user experience by avoiding the problem associated with having to use multiple remote controls for controlling multiple remotely controllable devices.

Figure 13:
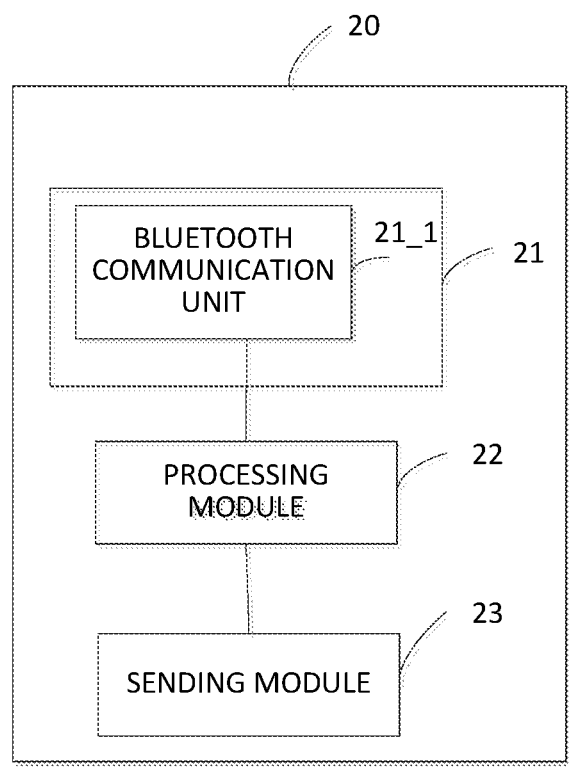
FIG. 13 is a block diagram illustrating an eighth embodiment of an apparatus for binding the remote control according to the disclosure.

Based on the embodiment shown in FIG. 12, FIG. 13 is a block diagram of an eighth apparatus embodiment of the present disclosure, illustrating an apparatus for binding the remote control. Referring to FIG. 13, the receiving module 21 of FIG. 12 comprises: a Bluetooth communication unit 21_1 configured to receive the binding request containing the identification information of the remote control and broadcasted by the remote control via Bluetooth, wherein the binding response message comprises Bluetooth pairing information generated by the apparatus for binding the remote control.

Figure 14:
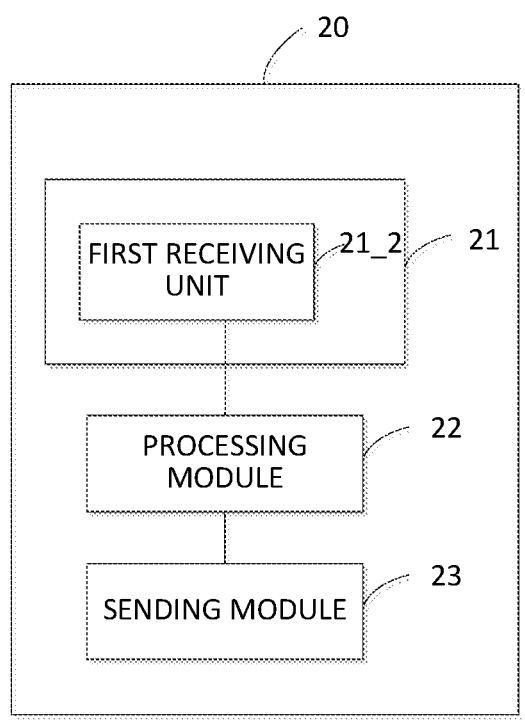
FIG. 14 is a block diagram illustrating a ninth embodiment of an apparatus for binding the remote control according to the disclosure.

Based on the embodiment shown in FIG. 12 or FIG. 13, FIG. 14 is a block diagram of a ninth apparatus embodiment of the present disclosure, illustrating an apparatus for binding the remote control. Referring to FIG. 14, the receiving module 21 of FIG. 12 comprises: a first receiving unit 21_2 configured to receive an operation request sent by the remote control and perform a corresponding operation based on the operation request.

Figure 15:
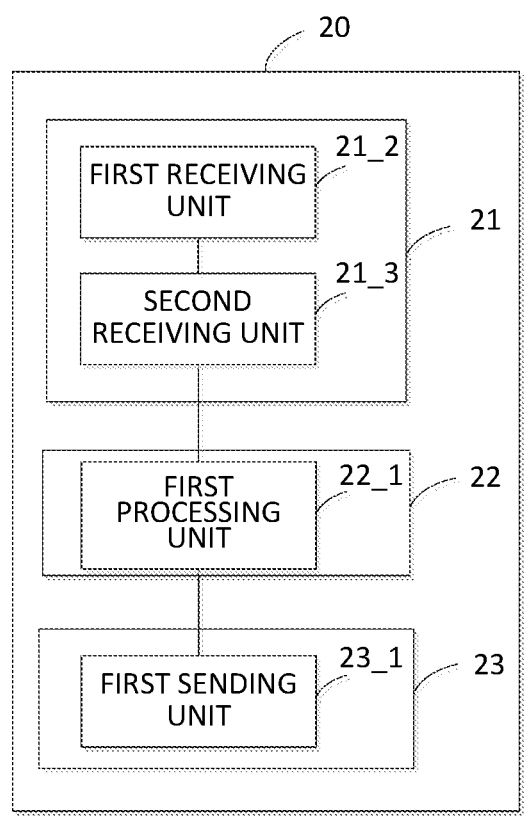
FIG. 15 is a block diagram illustrating a tenth embodiment of an apparatus for binding the remote control according to the disclosure.

Based on the embodiment shown in FIG. 14, FIG. 15 is a block diagram of a tenth apparatus embodiment of the present disclosure, illustrating an apparatus for binding the remote control. Referring to FIG. 15, the receiving module 21 of FIG. 12 further comprises: a second receiving unit 21_3 configured to receive a first unbinding request containing the identification information of the remote control and sent by the remote control. The processing module 22 comprises a first processing unit 221 configured to release the binding relation with the remote control and generate an unbinding response message, based on the first unbinding request. The sending module 23 comprises a first sending unit 23_1 configured to send the unbinding response message to the remote control.

Figure 16:
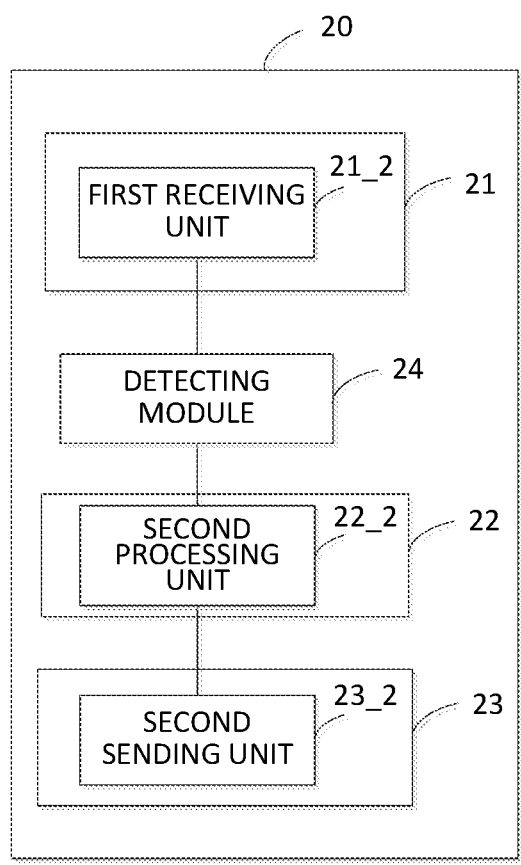
FIG. 16 is a block diagram illustrating an eleventh embodiment of an apparatus for binding the remote control according to the disclosure.

Based on the embodiment shown in FIG. 14, FIG. 16 is a block diagram of an eleventh apparatus embodiment of the present disclosure, illustrating an apparatus for binding the remote control. Referring to FIG. 16, the apparatus 20 of FIG. 12 further comprises: a detecting module 24 configured to detect an unbinding operation instruction from a user. The processing module 22 comprises a second processing unit 22_2 configured to generate a second unbinding request based on the unbinding operation instruction; and the sending module 23 comprises a second sending unit 23_2 configured to send the second unbinding request to the remote control so as to release the binding relation with the remote control.

The apparatus for binding a remote control provided above may equivalent to or part of a remotely controllable device, which can either initiate and send an unbinding request to the remote control based on the user's operation or receive an unbinding request sent by the remote control, in order to release the binding relation between the remote control and the previously bound remotely controllable device. Thus, binding and unbinding can be realized conveniently by the user, thereby improving user experience.

With respect to the remote control and the remotely controllable device in the above embodiments, the specific manners for the individual modules to perform operations have been described in detail in the embodiments of the related methods and will not be elaborated herein. Each module or unit discussed above for FIGS. 6-16, such as the acquisition module, the sending modules, the receiving modules, the first processing module, the first detecting unit, the second detecting unit, the Bluetooth communication units, the second processing module, the first acquiring unit, the first sending unit, the first receiving units, the second receiving units, the processing module, the first processing unit, the second processing unit, the first sending unit, and the second sending unit may take the form of a packaged functional hardware unit designed for use with other components, a portion of a program code (e.g., software or firmware) executable by the processor 1220 or 1322 or the processing circuitry that usually performs a particular function of related functions, or a self-contained hardware or software component that interfaces with a larger system, for example.

The above has described the internal functional modules and schematic structures of the remote control and the remotely controllable device.

Figure 17:
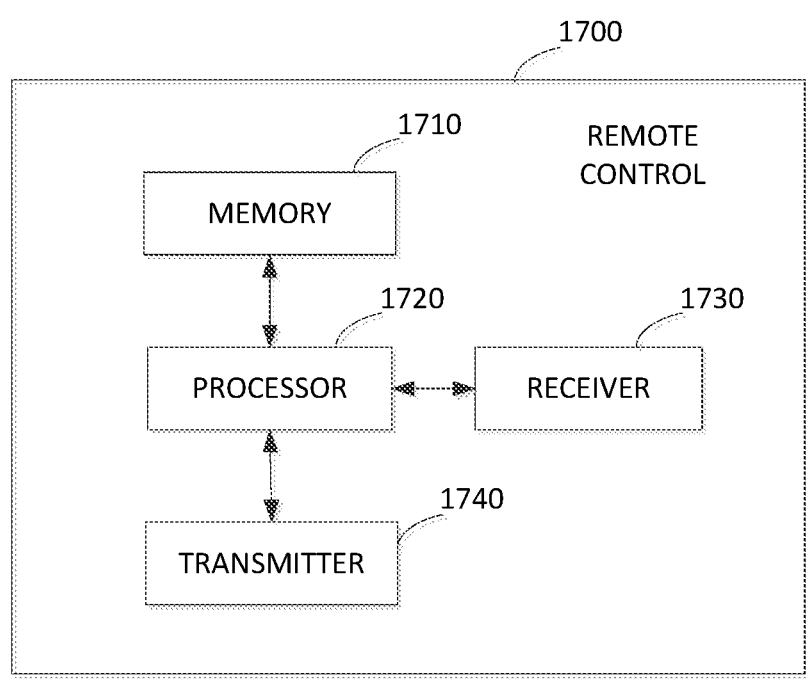
FIG. 17 is a block diagram of a remote control according to an exemplary embodiment.

FIG. 17 is a block diagram of a remote control 1700 according to an exemplary embodiment. Referring to FIG. 17, the remote control 1700 may be implemented as including: a processor 1720 configured to control execution of executable instructions, a memory 1710 configured to store the executable instructions executable by the processor 1720, a receiver 1730, and a transmitter 1740. The processor 1720 is configured to acquire a binding operation instruction. The transmitter is configured to send a binding request containing identification information of the remote control 1700 to a remotely controllable device which the remote control 1700 is to be bound with, such that the remotely controllable device generates a binding response message based on the binding request, the binding response message carrying authentication information for binding the remote control. The receiver 1730 is configured to receive the binding response message returned by the remotely controllable device. The processor 1720 is further configured to perform binding with the remotely controllable device based on the binding response message, so as to control the remotely controllable device.

Figure 18:
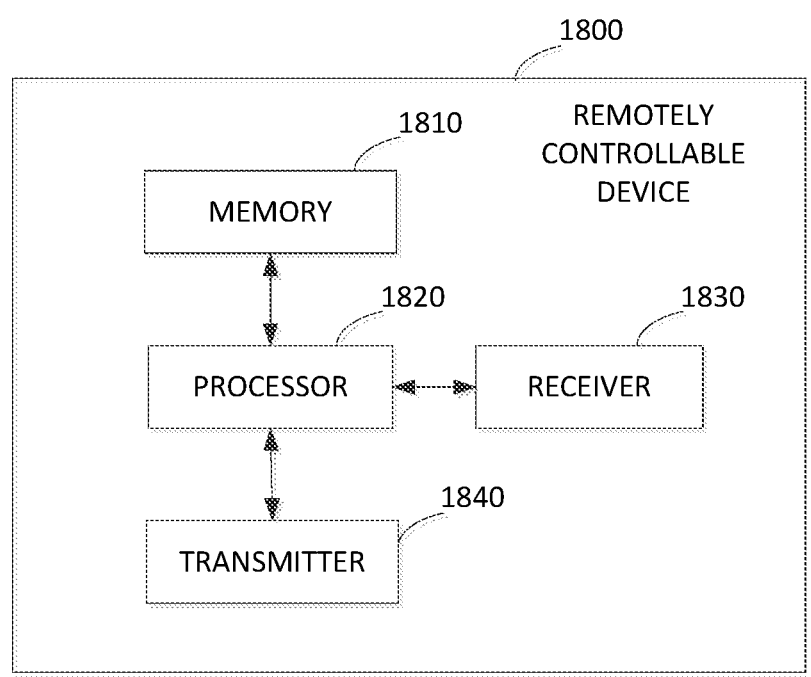
FIG. 18 is a block diagram of a remotely controllable device according to an exemplary embodiment.

FIG. 18 is a block diagram of a remotely controllable device 1800 according to an exemplary embodiment. Referring to FIG. 18, the remotely controllable device may be implemented as including: a processor 1820 configured to control execution of executable instructions, a memory 1810 configured to store the executable instructions executable by the processor 1820, a receiver 1830, and a transmitter 1840. The receiver 1830 is configured to receive a binding request containing identification information of a remote control and sent by the remote control. The processor 1820 is configured to generate a binding response message based on the binding request, the binding response message carrying authentication information for binding the remote control. The transmitter 1840 is configured to send the binding response message to the remote control, such that the remote control performs binding with the remotely controllable device 1800 based on the binding response message so as to become capable of controlling the remotely controllable device 1800.

In the above embodiments of the remote control and the remotely controllable device, it should be understood that the processor may be a central processing unit (CPU) or any other general-purpose processor, a digital signal processor (DSP), an application specific integrated circuit (ASIC) or the like. The general-purpose processor may be a microprocessor or any other conventional processor. The above-mentioned memory may be a read-only memory (ROM), a random access memory (RAM), a flash memory, a hard disk or a solid state disk. A SIM card, also called a user identification card or a smart card, may be mounted in a digital mobile phone before using the phone. That is, information of a user of the digital mobile phone, an encryption key, and the user's phonebook are stored in the computer chip of the card. The steps of the methods disclosed by the embodiments of the present disclosure may be performed by a hardware processor or by a combination of hardware of a processor and software modules.

Figure 19:
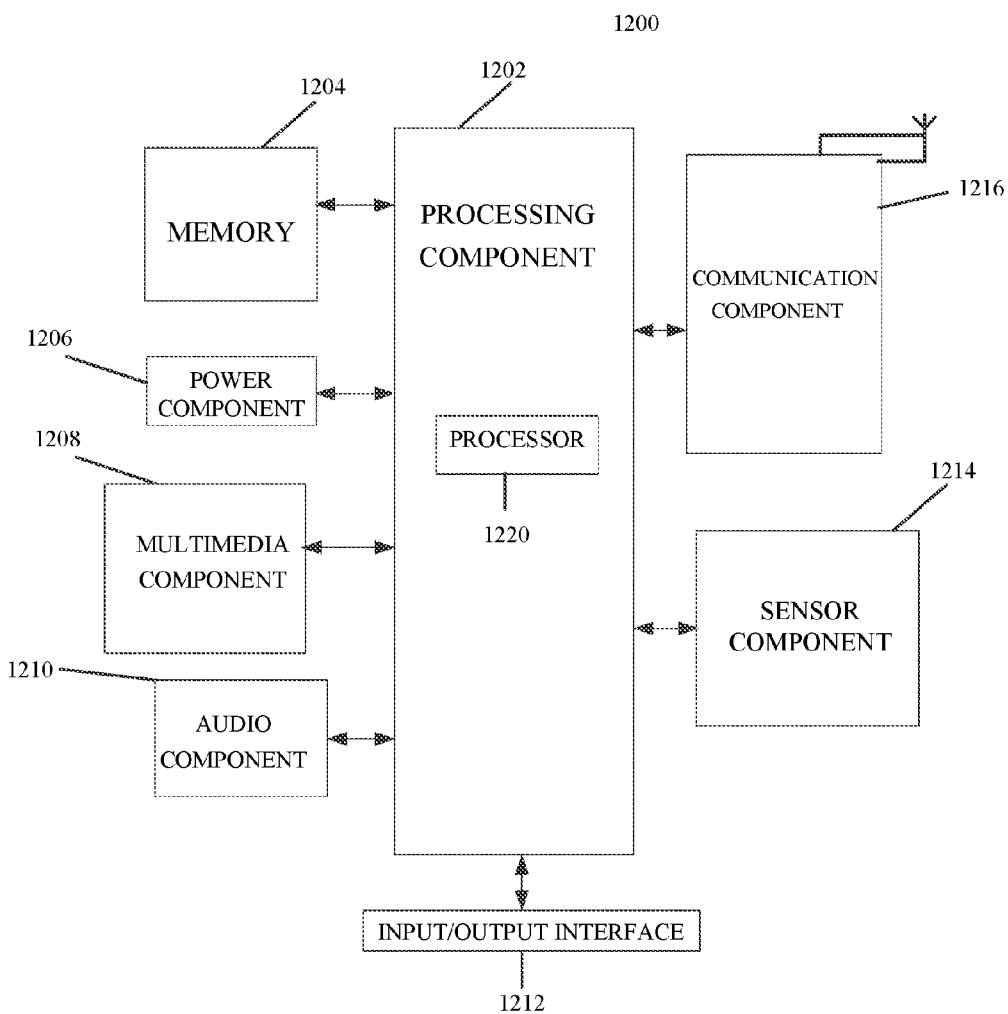
FIG. 19 is a block diagram of another remotely controllable device according to an exemplary embodiment.

FIG. 19 is a block diagram of a remotely controllable device 1200 according to an exemplary embodiment. Fox example, the remotely controllable device 1200 may be a device which can be controlled by a remote control, such as a mobile phone, a computer, a smart TV, a message transceiver, a tablet device, a medical device, a server, a smart home appliance such as an air conditioner etc.

Referring to FIG. 19, the remotely controllable device 1200 may comprise one or more following components: a processing component 1202, a memory 1204, a power component 1206, a multimedia component 1208, an audio component 1210, an input/output (I/O) interface 1212, a sensor component 1214 and a communication component 1216.

The processing component 1202 typically controls overall operations of the remotely controllable device 1200, such as the operations associated with display, data communications, multimedia operations and recording operations. The processing component 1202 may include one or more processors 1220 to execute instructions to perform all or part of the steps in the above described methods. Moreover, the processing component 1202 together with the memory 1204 may include one or more modules which facilitate the interaction between the processing component 1202 and other components. For example, the processing component 1202 may comprise a multimedia module to facilitate the interaction between the multimedia component 1208 and the processing component 1202.

The memory 1204 is configured to store various types of data to support the operation of the remotely controllable device 1200. Examples of such data comprise instructions for any applications or methods operated on the remotely controllable device 1200, various kinds of data, messages, pictures, video, etc. The memory 1204 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the remotely controllable device 1200. The power component 1206 may comprise a power management system, one or more power sources, and any other components associated with the generation, management, and distribution of power in the remotely controllable device 1200.

The multimedia component 1208 comprises a screen providing an output interface between the remotely controllable device 1200 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes and gestures on the touch panel. The touch sensors may not only sense a boundary of a touch or swipe action, but also sense a period of time and a pressure associated with the touch or swipe action.

The audio component 1210 is configured to output and/or input audio signals. For example, the audio component 1210 includes a microphone (MIC) configured to receive an external audio signal when the remotely controllable device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like.

The sensor component 1214 comprises one or more sensors to provide status assessments of various aspects of the remotely controllable device 1200. For instance, the sensor component 1214 may detect an open/closed status of the remotely controllable device 1200, relative positioning of components, e.g., the display and the keypad, of the remotely controllable device 1200, a change in position of the remotely controllable device 1200 or a component of the remotely controllable device 1200, presence or absence of user's contact with the remotely controllable device 1200, an orientation or an acceleration/deceleration of the remotely controllable device 1200, and a change in temperature of the remotely controllable device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor or a temperature sensor.

The communication component 1216 is configured to facilitate communication, wired or wirelessly, between the remotely controllable device 1200 and other devices. The remotely controllable device 1200 can access a wireless network based on a communication standard, such as Wi-Fi, 2G, 3G, LTE or 4G cellular standard, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the remotely controllable device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a processing method for binding a remote control. The method comprises: receiving, by the remotely controllable device, a binding request containing identification information of the remote control and sent by the remote control; generating, by the remotely controllable device, a binding response message based on the binding request, the binding response message carrying authentication information for binding the remote control; and sending, by the remotely controllable device, the binding response message to the remote control, such that the remote control performs binding with the remotely controllable device based on the binding response message, so as to control the remotely controllable device.

In an exemplary embodiment, there is also provided a non-transitory computer-readable storage medium comprising instructions, such as comprised in the memory 1204, executable by the processor 1220 in the remotely controllable device 1200, for performing the above-described methods. For example, the non-transitory computer-readable storage medium may be a ROM, a RAM, a CD-ROM, a magnetic tape, a floppy disc, an optical data storage device, and the like.

Figure 20:
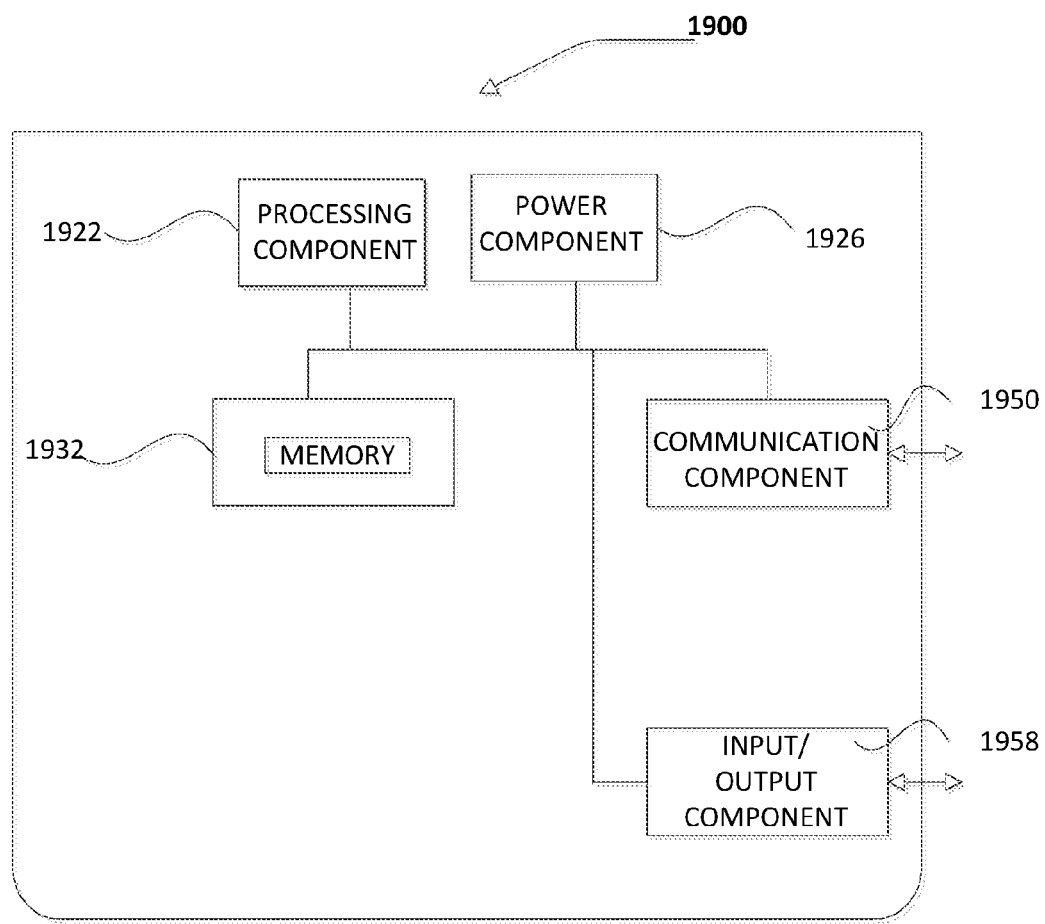
FIG. 20 is a block diagram of a remote control according to an exemplary embodiment.

FIG. 20 is a block diagram of a remote control 1900 according to an exemplary embodiment. For example, the remote control 1900 may be provided as a server. Referring to FIG. 20, the remote control 1900 comprises: a processing component 1922 which further comprises one or more processors; and memory resources represented by a memory 1932 for storing instructions executable by the processing component 1922, such as applications. The applications stored in the memory 1932 may comprise one or more modules, each corresponding to a set of instructions. In addition, the processing component 1922 is configured to execute instructions to perform a processing method for binding a remote control. The method comprises: acquiring a binding operation instruction by the remote control; sending, by the remote control, a binding request containing identification information of the remote control to a remotely controllable device which the remote control is to be bound with, such that the remotely controllable device generates a binding response message based on the binding request, the binding response message carrying authentication information for binding the remote control; receiving, by the remote control, the binding response message returned by the remotely controllable device; and performing, by the remote control, binding with the remotely controllable device based on the binding response message, so as to control the remotely controllable device.

The remote control 1900 may further comprise: a power component 1926 configured to perform power management for the remote control 1900, a communication component 1950 configured to perform communications between the remote control 1900 and the remotely controllable device, and an input/output component 1958 configured to collect operations of users.

Other embodiments of the disclosure will be apparent to those of ordinary skill in the art based on consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for binding a remote control, comprising:
    acquiring, by the remote control, a binding operation instruction;
    sending, by the remote control, a binding request containing identification information of the remote control to a remotely controllable device with which the remote control is to be bound such that the remotely controllable device generates a binding response message in response to the binding request, wherein the binding response message comprises authentication information for binding the remote control;
    receiving, by the remote control, the binding response message from the remotely controllable device; and
    performing, by the remote control, verification and authentication based on the authentication information in the binding response message; and
    when the verification and authentication is successful, binding, by the remote control, with the remotely controllable device, such that the remotely controllable device becomes bound to the remote control and the remote control becomes capable of controlling the bound remotely controllable device.

2. The method of claim 1, wherein acquiring the binding operation instruction by the remote control comprises:
    detecting, by the remote control, a pressing operation by a user on a binding key of the remote control as the binding operation instruction; or
    detecting, by the remote control, a shaking operation of the remote control by the user as the binding operation instruction.

3. The method of claim 1, wherein sending, by the remote control, the binding request containing the identification information of the remote control to the remotely controllable device comprises sending, by the remote control, the binding request containing the identification information of the remote control through Bluetooth broadcasting; and
    wherein the binding response message comprises Bluetooth pairing information generated by the remotely controllable device.

4. The method of claim 1, further comprising: remotely controlling the bound remotely controllable device by the remote control in response to an operation of a user on the remote control.

5. The method of claim 2, further comprising: remotely controlling the bound remotely controllable device by the remote control based on an operation of the user on the remote control.

6. The method of claim 3, further comprising: remotely controlling the bound remotely controllable device by the remote control based on an operation of a user on the remote control.

7. The method of claim 4, further comprising:
    acquiring, by the remote control, an unbinding operation instruction;
    sending, by the remote control, a first unbinding request containing the identification information of the remote control to the bound remotely controllable device, such that, in response to the first unbinding request, the bound remotely controllable device releases a binding relation with the remote control and generates an unbinding response message; and
    receiving, by the remote control, the unbinding response message generated by the bound remotely controllable device.

8. The method of claim 5, further comprising:
    acquiring, by the remote control, an unbinding operation instruction;
    sending, by the remote control, a first unbinding request containing the identification information of the remote control to the bound remotely controllable device, such that, in response to the first unbinding request, the bound remotely controllable device releases a binding relation with the remote control and generates an unbinding response message; and
    receiving, by the remote control, the unbinding response message generated by the bound remotely controllable device.

9. The method of claim 6, further comprising:
acquiring, by the remote control, an unbinding operation instruction;
sending, by the remote control, a first unbinding request containing the identification information of the remote control to the bound remotely controllable device, such that, in response to the first unbinding request, the bound remotely controllable device releases a binding relation with the remote control and generates an unbinding response message; and
receiving, by the remote control, the unbinding response message generated by the bound remotely controllable device.

10. The method of claim 4, further comprising:
receiving, by the remote control, a second unbinding request sent by the bound remotely controllable device after the bound remotely controllable device detects an unbinding operation instruction from the user; and
releasing, by the remote control, binding relation with the bound remotely controllable device in response to the second unbinding request.

11. The method of claim 5, further comprising:
receiving, by the remote control, a second unbinding request sent by the remotely controllable device after the bound remotely controllable device detects an unbinding operation instruction from the user; and
releasing, by the remote control, binding relation with the bound remotely controllable device in response to the second unbinding request.

12. The method of claim 6, further comprising:
receiving, by the remote control, a second unbinding request sent by the remotely controllable device after the bound remotely controllable device detects an unbinding operation instruction from the user; and
releasing, by the remote control, binding relation with the bound remotely controllable device in response to the second unbinding request.

13. A remote control, comprising:
a memory configured to store executable instructions;
a processor configured to control execution of the executable instructions;
a receiver; and
a transmitter,
wherein:
the processor is configured to acquire a binding operation instruction;
the transmitter is configured to send a binding request containing identification information of the remote control to a remotely controllable device with which the remote control is to be bound such that the remotely controllable device generates a binding response message in response to the binding request, wherein the binding response message comprises authentication information for binding the remote control;
the receiver is configured to receive the binding response message from the remotely controllable device;
the processor is further configured to perform verification and authentication based on the authentication information in the binding response message; and
when the verification and authentication is successful, the processor is configured to bind with the remotely controllable device, such that the remotely controllable device becomes bound to the remote control and the remote control becomes capable of controlling the bound remotely controllable device.

14. The remote control of claim 13, wherein to acquire the binding operation instruction, the processor is configured to:
detect a pressing operation by a user on a binding key of the remote control as the binding operation instruction; or
detect a shaking operation on the remote control by the user as the binding operation instruction.

15. The remote control of claim 13, wherein to send the binding request containing the identification information of the remote control to the remotely controllable device, the processor is configured to:
send the binding request containing the identification information of the remote control through Bluetooth broadcasting; and
wherein the binding response message comprises Bluetooth pairing information generated by the remotely controllable device.

16. The remote control of claim 13, wherein the processor is further configured to: remotely control the bound remotely controllable device by the remote control in response to an operation of a user on the remote control.

17. The remote control of claim 16, wherein the processor is further configured to:
acquire an unbinding operation instruction;
send a first unbinding request containing the identification information of the remote control to the bound remotely controllable device such that the bound remotely controllable device releases binding relation with the remote control and generates an unbinding response message; and
receive the unbinding response message sent by the bound remotely controllable device.

18. The remote control of claim 16, wherein the processor is further configured to:
receive a second unbinding request sent by the bound remotely controllable device after the bound remotely controllable device detects an unbinding operation instruction from the user; and
release binding relation with the bound remotely controllable device in response to the second unbinding request.

19. A non-transitory computer-readable storage medium having stored therein instructions that, when executed by a processor of a mobile controller, cause a remote control to:
acquire a binding operation instruction;
send a binding request containing identification information of the remote control to a remotely controllable device with which the remote control is to be bound, such that the remotely controllable device generates a binding response message in response to the binding request, wherein the binding response message comprises authentication information for binding the remote control;
receive the binding response message from the remotely controllable device; and
perform verification and authentication based on the authentication information in the binding response message; and
when the verification and authentication is successful, bind with the remotely controllable device, such that the remotely controllable device becomes bound to the remote control and the remote control becomes capable of controlling the bound remotely controllable device.

20. The non-transitory computer-readable storage medium of claim 19, wherein the instructions, when executed by the processor of the controller to cause the remote control to acquire the binding operation instruction, cause the remote control to:

detect a pressing operation by a user on a binding key of the remote control, as the binding operation instruction; or detect a shaking operation on the remote control by the user, as the binding operation instruction.

\* \* \* \* \*